United States Patent
Troetsch-Schaller et al.

(10) Patent No.: US 10,557,096 B2
(45) Date of Patent: Feb. 11, 2020

(54) COPOLYMER AND USE THEREOF FOR REDUCING CRYSTALLIZATION OF PARAFFIN CRYSTALS IN FUELS

(71) Applicant: BASF SE, Ludwigshafen (DE)

(72) Inventors: Irene Troetsch-Schaller, Bissersheim (DE); Ivette Garcia Castro, Ludwigshafen (DE); Michael Schroers, Ludwigshafen (DE); Uwe Rebholz, Mehlingen (DE); Hubert Rehberger, Ruelzheim (DE); Dieter Faul, Niederkirchen (DE)

(73) Assignee: BASF SE, Ludwigshafen (DE)

( * ) Notice: Subject to any disclaimer, the term of this patent is extended or adjusted under 35 U.S.C. 154(b) by 52 days.

(21) Appl. No.: 15/531,303

(22) PCT Filed: Nov. 11, 2015

(86) PCT No.: PCT/EP2015/076317
§ 371 (c)(1),
(2) Date: May 26, 2017

(87) PCT Pub. No.: WO2016/083130
PCT Pub. Date: Jun. 2, 2016

(65) Prior Publication Data
US 2017/0355916 A1 Dec. 14, 2017

(30) Foreign Application Priority Data
Nov. 27, 2014 (EP) .................................... 14195177

(51) Int. Cl.
| | | |
|---|---|---|
| *C10L 1/14* | (2006.01) | |
| *C08F 220/18* | (2006.01) | |
| *C08F 210/16* | (2006.01) | |
| *C08F 8/44* | (2006.01) | |
| *C10L 10/14* | (2006.01) | |

(52) U.S. Cl.
CPC .............. *C10L 1/146* (2013.01); *C08F 8/44* (2013.01); *C08F 210/16* (2013.01); *C08F 220/18* (2013.01); *C10L 10/14* (2013.01); *C08F 2220/1825* (2013.01); *C08F 2220/1858* (2013.01); *C08F 2220/1866* (2013.01); *C08F 2220/1883* (2013.01); *C08F 2220/1891* (2013.01); *C10L 2200/0446* (2013.01); *C10L 2270/026* (2013.01)

(58) Field of Classification Search
CPC combination set(s) only.
See application file for complete search history.

(56) References Cited

U.S. PATENT DOCUMENTS

| | | | |
|---|---|---|---|
| 4,511,369 A | 4/1985 | Denis et al. | |
| 4,526,950 A | 7/1985 | Grava | |
| 5,391,632 A * | 2/1995 | Krull .................... | C08F 8/32 525/327.6 |
| 6,444,754 B1 * | 9/2002 | Chin ..................... | C08L 67/02 525/133 |
| 2003/0163951 A1 | 9/2003 | Eydoux et al. | |
| 2008/0244964 A1 | 10/2008 | Eydoux et al. | |
| 2012/0316306 A1 | 12/2012 | Yoshikawa et al. | |
| 2013/0133243 A1 * | 5/2013 | Roger-Gopfert ........ | C10L 1/221 44/330 |

FOREIGN PATENT DOCUMENTS

| | | |
|---|---|---|
| DE | 600 16 804 T2 | 12/2005 |
| EP | 0 606 055 A2 | 7/1994 |
| EP | 1 526 167 A2 | 4/2005 |
| EP | 1 857 529 A1 | 11/2007 |
| EP | 2 535 396 A1 | 12/2012 |
| FR | 2 592 888 A1 | 7/1987 |
| WO | 95/07944 A1 | 3/1995 |
| WO | 99/25668 A1 | 5/1999 |
| WO | 99/29748 A1 | 6/1999 |
| WO | 2004/035715 A1 | 4/2004 |
| WO | 2007/147753 A2 | 12/2007 |
| WO | 2009/124979 A1 | 10/2009 |

OTHER PUBLICATIONS

International Preliminary Report on Patentability dated Jun. 8, 2017 in PCT/EP2015/076317 filed Nov. 11, 2015.
International Search Report and Written Opinion of the International Searching Authority dated Apr. 12, 2016 in PCT/EP2015/076317 filed Nov. 11, 2015 (with English translation and English translation of categories of cited documents).
"Automotive fuels—Diesel—Requirements and Test Methods" DIN EN 590, Aug. 2017, 18 Pages.
"Liquid Fuels—Fuel Oils—Part 1: Fuel Oils EL, Minimum Requirements" DIN 51603, 2011, 9 Pages.
International Search Report dated Apr. 12, 2016 in PCT/EP2015/076317 Filed Nov. 11, 2015.

* cited by examiner

*Primary Examiner* — Prem C Singh
*Assistant Examiner* — Chantel L Graham
(74) *Attorney, Agent, or Firm* — Oblon, McClelland, Maier & Neustadt, L.L.P.

(57) ABSTRACT

The present invention relates to a novel copolymer, to processes for preparation thereof and to the use thereof.

13 Claims, No Drawings

COPOLYMER AND USE THEREOF FOR REDUCING CRYSTALLIZATION OF PARAFFIN CRYSTALS IN FUELS

The present invention relates to a copolymer obtainable by copolymerization of (A) at least one unsaturated dicarboxylic acid or derivatives thereof, (B) at least one α-olefin having from at least 6 up to and including 20 carbon atoms, (C) at least one $C_3$- to $C_{20}$-alkyl ester of acrylic acid or methacrylic acid or a mixture of such alkyl esters and (D) optionally one or more further copolymerizable monomers other than monomers (A), (B) and (C), followed by the reaction with at least one dialkylamine (E), where the two alkyl radicals in the at least one dialkylamine (E) are independently alkyl radicals having at least 17 up to 30 carbon atoms.

The present invention further relates to a process for preparing this copolymer.

The present invention further relates to the use of this copolymer for modifying the crystallization of paraffin crystals in fuels.

Middle distillate fuels of fossil origin, especially gas oils, diesel oils or light heating oils, which are obtained from mineral oil, have different contents of paraffins according to the origin of the crude oil. At low temperatures, there is precipitation of solid paraffins at the cloud point ("CP"). It is thought that, in the course of further cooling, the platelet-shaped n-paraffin crystals form a kind of "house of cards" structure" and the middle distillate fuel ceases to flow even though its predominant portion is still liquid. The precipitated n-paraffins in the temperature range between cloud point and pour point ("PP") considerably impair the flowability of the middle distillate fuels; the paraffins block filters and cause irregular or completely interrupted fuel supply to the combustion units. Similar disruptions occur in the case of light heating oils.

It has long been known that suitable additives can modify the crystal growth of the n-paraffins in middle distillate fuels. Additives of good efficacy prevent middle distillate fuels from already solidifying at temperatures a few degrees Celsius below the temperature at which the first paraffin crystals crystallize out. Instead, fine, readily crystallizing, separate paraffin crystals are formed, which, even when the temperature is lowered further, pass through the filters in motor vehicles and heating systems, or at least form a filtercake which is permeable to the liquid portion of the middle distillates, so that disruption-free operation is assured. The efficacy of the flow improvers is typically expressed, in accordance with European standard EN 116, indirectly by measuring the cold filter plugging point ("CFPP"). Cold flow improvers or middle distillate flow improvers ("MDFIs") of this kind which are used have long included, for example, ethylene-vinyl carboxylate copolymers such as ethylene-vinyl acetate copolymers ("EVA").

The problem with cold flow behavior is manifested similarly in the case of biofuels, for example what is called "biodiesel", and mixtures of middle distillate fuels and biofuel oils. Here, the cold flow characteristics can in principle be improved using the same additives as for pure middle distillate fuels.

One disadvantage of these additives when used in middle distillate fuels is that the paraffin crystals modified in this way, because of their higher density compared to the liquid portion, have a tendency to settle out more and more at the base of the fuel container, for example the reservoir tank, in the course of storage of the middle distillate fuel. This results in formation of a homogeneous low-paraffin phase in the upper part of the vessel and a biphasic paraffin-rich layer at the base. Since the fuel is usually drawn off not very far above the base of the container both in motor vehicle tanks and in storage or supply tanks belonging to mineral oil dealers, there is the risk that the high concentration of solid paraffins will lead to blockages of filters and metering units. The further the storage temperature drops below the precipitation temperature of the paraffins, the greater this risk becomes, since the amount of paraffin precipitated increases with falling temperature. More particularly, fractions of biodiesel also enhance this unwanted tendency of the middle distillate fuel to paraffin sedimentation. The additional use of paraffin dispersants or wax anti-settling additives ("WASAs") can reduce the problems outlined.

WO 95/07944 discloses preparing copolymers from a monoethylenically unsaturated $C_4$-$C_6$ dicarboxylic acid or anhydride thereof, oligomers of propene or of a branched 1-olefin having 4 to 10 carbon atoms and a monoethylenically unsaturated compound, and then reacting them with an amine component. The products are used as detergents in fuels.

EP 1526167 A2 and EP 1857529 A1 disclose using EVA copolymers in a mixture with copolymers of maleic anhydride and α-olefins having 10 to 20 carbon atoms, reacted with primary or secondary amines having $C_8$- to $C_{16}$-alkyl radicals. The amines are incorporated via amide or imide bonds. The length of the radicals of α-olefin and alkyl radicals of the amine have to fulfill a particular ratio in order to be suitable as cold flow improvers for fuel oils.

The problem addressed was that of providing products which reduce this unwanted tendency of middle distillate fuels to paraffin sedimentation.

The problem is solved in accordance with the invention by the copolymer mentioned at the outset, formed from components (A), (B), (C) and optionally (D) and (E).

Monomer (A) comprises at least one, preferably one to three, more preferably one or two and most preferably exactly one unsaturated dicarboxylic acid(s) or derivatives thereof.

Derivatives are understood to mean
the anhydrides in question, in monomeric or else polymeric form,
mono- or dialkyl esters, preferably mono- or di-$C_1$-$C_4$-alkyl esters, more preferably mono- or dimethyl esters or the corresponding mono- or diethyl esters,
mixed esters, preferably mixed esters having different $C_1$-$C_4$-alkyl components, more preferably mixed methyl ethyl esters, and
mono- and diamides, and also imides, obtainable by reaction of the unsaturated dicarboxylic acid with primary amines or secondary amines, preferably $C_1$-$C_{30}$-alkylamines or di-$C_1$-$C_{30}$-alkylamines.

The derivatives are preferably anhydrides in monomeric form or di-$C_1$-$C_4$-alkyl esters, more preferably anhydrides in monomeric form.

In a further preferred embodiment, the derivatives are di- or monoamides, preferably monoamides, obtainable by reaction of the unsaturated dicarboxylic acid with dialkylamines (E) wherein the alkyl radicals independently have at least 17 up to 30 carbon atoms.

In the context of this document, $C_1$-$C_4$-alkyl is understood to mean methyl, ethyl, iso-propyl, n-propyl, n-butyl, iso-butyl, sec-butyl and tert-butyl, preferably methyl and ethyl, more preferably methyl.

The unsaturated dicarboxylic acid comprises those dicarboxylic acids or derivatives thereof in which the two carboxyl groups are conjugated to the ethylenically unsaturated double bond.

Examples thereof are maleic acid, fumaric acid, 2-methylmaleic acid, 2,3-dimethylmaleic acid, 2-methylfumaric acid, 2,3-dimethylfumaric acid, methylenemalonic acid and tetrahydrophthalic acid, preferably maleic acid and fumaric acid and more preferably maleic acid, and derivatives thereof.

Monomer (A) is especially maleic anhydride.

Monomer (B) comprises at least one, preferably one to four, more preferably one to three, even more preferably one or two and especially exactly one α-olefin(s) having from at least 6 up to and including 20 carbon atoms. The α-olefins (B) preferably have at least 8, more preferably at least 10, carbon atoms. The α-olefins (B) preferably have up to and including 18, more preferably up to and including 16 and most preferably up to and including 14 carbon atoms.

If monomer (B) is a mixture of different olefins, the determination of the number of carbon atoms should be based on the statistical average of the numbers of carbon atoms in the olefins present in the mixture. Accordingly, a mixture of 50 mol % of $C_{22}$ olefin and 50 mol % of $C_{16}$ olefin has a statistical average of 19 carbon atoms.

In a preferred embodiment, however, essentially all the α-olefins present in the mixture have the above-specified number of carbon atoms, preferably at least 90 mol %, more preferably at least 95 mol % and most preferably at least 98 mol %.

The α-olefins may preferably be linear or branched, preferably linear, 1-alkenes.

Examples thereof are 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene, of which preference is given to 1-decene, 1-dodecene, 1-tetradecene and 1-hexadecene and particular preference to 1-dodecene.

Monomer (C) is at least one, preferably one to four, more preferably one to three, even more preferably one or two and especially exactly one $C_4$- to $C_{20}$-alkyl ester(s) of acrylic acid or methacrylic acid, preferably of acrylic acid, or a mixture of such alkyl esters. The alkyl radical in each case may be straight-chain or branched.

Suitable $C_3$- to $C_{20}$-alkyl esters of acrylic acid or methacrylic acid, preferably of acrylic acid, for component (C) are preferably the esters of acrylic acid and methacrylic acid with $C_3$- to $C_{18}$-alkanols, preferably with $C_4$- to $C_{18}$-alkanols, more preferably with $C_8$- to $C_{16}$-alkanols, even more preferably $C_{10}$- to $C_{14}$-alkanols and especially $C_{12}$-alkanols, for example with n-propanol, isopropanol, n-butanol, sec-butanol, isobutanol, tert-butanol, n-pentanol, tert-pentanol, n-hexanol, n-heptanol, n-octanol, 2-ethylhexanol, n-nonanol, isononanol, n-decanol, 2-propylheptanol, n-undecanol, isoundecanol, n-dodecanol, n-tridecanol, isotridecanol, 3,3,5,5,7-pentamethyloctanol, n-tetradecanol, n-pentadecanol, n-hexadecanol, n-heptadecanol, iso-heptadecanol, 3,3,5,5,7,7,9-heptamethyldecanol, n-octadecanol and n-eicosanol. Also conceivable are mixtures of $C_{17}$-alkanols, as described in WO 2009/124979.

In one embodiment, the alkanols are branched $C_{13}$- or $C_{17}$-alkanols or mixtures thereof having a mean degree of branching according to the iso index of 1.2 to 3.0, especially of 1.7 to 2.5.

Alkanols of this kind or mixtures thereof are obtainable by oligomerization of $C_4$ hydrocarbon streams, especially homogeneously or heterogeneously catalyzed oligomerization of technical grade $C_4$ streams composed of 10% to 90% by weight of butane, 10% to 90% by weight of linear butenes (butene-1, cis- and trans-butene-2) and 1% to 5% by weight of isobutene, for example of raffinate II. A heterogeneous catalyst typical for this purpose comprises nickel. The oligomerization is usually conducted at temperatures of 30 to 280° C. and pressures of 10 to 300 bar. Oligomerization reactions of this kind are described, for example, in WO 99/25668 (5). The oligomerization products are subsequently hydroformylated and hydrogenated and thus give rise to the alkanols or alkanol mixtures mentioned.

Component (C) is preferably n-decyl (meth)acrylate, 2-propylheptyl (meth)acrylate, n-undecyl (meth)acrylate, n-dodecyl (meth)acrylate, n-tridecyl (meth)acrylate, isotridecyl (meth)acrylate or n-tetradecyl (meth)acrylate, more preferably n-dodecyl (meth)acrylate or n-tetradecyl (meth)acrylate or mixtures thereof and most preferably the respective acrylates.

The optional further monomers (D), which are different than monomers (A), (B) and (C), are preferably selected from the group consisting of cycloaliphatic (meth)acrylates (D1), (meth)acrylates of polyalkylene glycol monoalkyl ethers (D2), vinyl alkanoates (D3), allyl compounds (D4), vinyl ethers (D5), N-vinyllactams (D6), N-vinylimidazoles (D7), ethylenically unsaturated aromatics (D8), sulfur dioxide (D9) and ethylenically unsaturated nitriles (D10).

It is possible here for at least one monomer (D), preferably one to four, more preferably one to three, even more preferably one or two and especially exactly one monomer(s) (D) to be used optionally.

Examples of cycloaliphatic (meth)acrylates (D1) are (meth)acrylates of alcohols having at least one, preferably one or two and more preferably one cycloaliphatic ring system(s) and having 5 to 20 carbon atoms. Preferred monomers are cyclopentyl (meth)acrylate, cyclohexyl (meth)acrylate and norbornyl (meth)acrylate, particular preference being given to the respective acrylates.

(Meth)acrylates of polyalkylene glycol monoalkyl ethers (D2) are preferably (meth)acrylic esters of mono-$C_1$-$C_4$-alkyl ethers of poly-1,2-propylene glycol having a molar mass between 134 and 1178 or polyethylene glycol having a molar mass between 106 and 898, and also ethylene glycol mono-$C_1$-$C_4$-alkyl ethers or propylene glycol mono-$C_1$-$C_4$-alkyl ethers. Particular preference is given to ethylene glycol monomethyl ether, ethylene glycol monoethyl ether, ethylene glycol mono-n-butyl ether, 1,2-propanediol monomethyl ether, 1,2-propanediol monoethyl ether, diethylene glycol monomethyl ether, diethylene glycol monoethyl ether and diethylene glycol mono-n-butyl ether.

Among the vinyl alkanoates (D3), preference is given to vinyl acetate, vinyl propionate, vinyl butanoate, vinyl pentanoate, vinyl hexanoate, vinyl 2-ethylhexanoate, vinyl octanoate, vinyl ester of neodecanoic acid ("Veova"), vinyl decanoate, vinyl dodecanoate, vinyl tridecanoate, vinyl isotridecanoate, vinyl tetradecanoate, vinyl pentadecanoate, vinyl hexadecanoate and vinyl octadecanoate, particular preference to vinyl acetate, vinyl propionate, vinyl hexanoate, vinyl 2-ethylhexanoate, and vinyl ester of neodecanoic acid ("Veova"), very particular preference to vinyl acetate.

Among the allyl compounds (D4), preference is given to allyl alcohol, allyl alcohol $C_1$-$C_4$-alkyl ethers and allyl alkanoates of those carboxylic acids as listed under (D3).

Among the vinyl ethers (D5), preference is given to cyclohexyl vinyl ether, isopropyl vinyl ether, isobutyl vinyl ether, tert-butyl vinyl ether, n-butyl vinyl ether, octyl vinyl ether, decyl vinyl ether, dodecyl vinyl ether, tetradecyl vinyl ether, hexadecyl vinyl ether and octadecyl vinyl ether.

N-Vinyllactams (D6) are preferably N-vinylcaprolactam and N-vinylpyrrolidone.

Among the N-vinylimidazoles (D7), preference is given to N-vinylimidazole.

Among the ethylenically unsaturated aromatics (D8), preference is given to styrene and 1-methylstyrene, particular preference to styrene.

Among the ethylenically unsaturated nitriles (D10), preference is given to acrylonitrile and methacrylonitrile, particular preference to acrylonitrile.

Among the optionally usable monomers (D), preference is given to (D1), (D3), (D5) and/or (D8), particular preference to (D1), (D3) and/or (D5), very particular preference to (D1) and/or (D3).

The stoichiometry of the monomers (A), (B), (C) and optionally (D) is preferably chosen such that the monomers in copolymerized form have a molar incorporation ratio of (A):(B):(C):(D) of 1:0.5 to 2.0:0.5 to 2.0:0 to 0.1.

Preferably, the molar incorporation ratio (A):(B):(C):(D) is 1:0.6 to 1.5:0.6 to 1.5:0 to 0.05.

More preferably, the molar incorporation ratio (A):(B):(C):(D) is 1:0.7 to 1.0:0.7 to 1.0:0.

The inventive copolymer is obtainable in a first step by polymerizing a mixture of the monomers (A), (B), (C) and optionally (D).

The copolymers are obtainable by the customary copolymerization processes, for example solvent polymerization, emulsion polymerization, precipitation polymerization or bulk polymerization, preferably solvent polymerization or bulk polymerization; they are preferably obtained via said copolymerization processes.

In a first preparation stage, the monomer components can be polymerized neat, in emulsion or preferably in solution. It is possible here to use a single monomer species or a mixture of several such monomer species for each monomer component. The polymerization reaction is generally conducted at standard pressure and under a protective gas, such as nitrogen, but it is also possible to work at elevated pressures of up to 25 bar, for example in an autoclave. The polymerization temperatures are generally 50 to 250° C., especially 90 to 210° C., in particular 120 to 180° C., typically 140 to 160° C. Suitable polymerization reactors are in principle all customary continuous or batchwise apparatuses, for example a stirred tank, stirred tank cascade, tubular reactor or loop reactor.

Typically, the polymerization is initiated by initiators that break down by a free-radical mechanism; suitable initiators for this purpose are air or oxygen of organic peroxides and/or hydroperoxides, and also organic azo compounds. Examples of useful organic peroxides or hydroperoxides include diisopropylbenzene hydroperoxide, cumene hydroperoxide, methyl isobutyl ketone peroxide, di-tert-butyl peroxide and tert-butyl perisononanoate. An example of a suitable organic azo compound is azobisisobutyronitrile ("AIBN"). In addition, it is possible to use suitable chain transfer agents in the polymerization as well, such as thio alcohols, aldehydes or ketones.

If solvents or emulsion media are used in the polymerization as well, the customary high-boiling inert liquids are useful for this purpose, such as aliphatic hydrocarbons, e.g. heptane, Shellsol® D70, white oil, lamp oil), aromatic hydrocarbons, e.g. ethylbenzene, diethylbenzenes, toluene, xylenes or corresponding technical hydrocarbon mixtures such as Shellsol®, Solvesso® or Solvent Naphtha, and also dialkyl 1,2-cyclohexanedicarboxylates, preferably diisononyl 1,2-cyclohexanedicarboxylate.

In a second reaction stage, the copolymer thus obtainable, preferably the copolymer thus obtained, is reacted with the dialkylamine (E). The reaction generally does not require any catalysts; instead, the reaction can be effected at temperatures of 50 to 160° C., preferably 60 to 140 and more preferably 70 to 120° C. The reaction can preferably be effected in an inert solvent, preference being given to the solvents listed above for the polymerization.

The dialkylamine (E) is at least one, preferably one or two and more preferably exactly one dialkylamine(s) (E), wherein the alkyl radicals are each independently alkyl radicals having at least 17 up to 30, preferably 17 to 26, more preferably 17 to 24 and most preferably 17 to 22 carbon atoms.

The two alkyl radicals may be the same or different, preferably the same.

The alkyl radicals having 17 up to 30 carbon atoms may be linear or branched, preferably linear, particular preference being given to n-heptadecyl, n-octadecyl, n-nonadecyl, n-eicosyl, n-heneicosyl, n-docosyl, lignoceryl, ceryl and myricyl, and particular preference to n-octadecyl, n-nonadecyl and n-eicosyl.

Preferred dialkylamines (E) are di-n-octadecylamine, di-n-nonadecylamine and di-n-eicosylamine.

The molar ratio of dialkylamine (E) based on incorporated units of the dicarboxylic acid (A) in the copolymer is preferably at least 1.2:1, more preferably 1.3 to 2.0:1, even more preferably 1.5 to 2.0:1 and especially 2.0:1.

In a preferred embodiment, the dialkylamine is used in such a way that, ideally, one equivalent of dialkylamine (E) reacts with the incorporated units of the dicarboxylic acid (A) in the copolymer to form amide groups and one further equivalent of dialkylamine (E) neutralizes the free carboxyl groups formed.

In a further embodiment, it is possible to dispense with the second reaction stage if the monomer (A) is already used in the form of the di- or monoamide, preferably of the monoamide, of the unsaturated dicarboxylic acid with dialkylamines (E).

In this case, amidation of the copolymer formed from (A), (B) and (C), and optionally (D), is no longer required since the monomer (A) has already been used in the polymerization as the corresponding amide. In this case, the free carboxyl groups present in the copolymer thus obtained may still be neutralized to an extent of 20 to 100 mol % with the dialkylamine (E).

The inventive copolymer, after reaction with component (E), preferably has a weight-average molecular weight ($M_w$) in the range from 2000 to 20 000, more preferably from 2200 to 8000 and most preferably from 2500 to 6000 g/mol (determined in each case by gel permeation chromatography). The polydispersity is preferably up to 3, more preferably 2 to 3.

The inventive copolymer can preferably be used in fuels in its function as a paraffin dispersant ("WASA"). The inventive copolymer often displays its action as a paraffin dispersant particularly well only once together with the customary flow improvers.

In the context of present invention, flow improvers shall be understood to mean all additives which improve the cold properties of middle distillate fuels. As well as the actual cold flow improvers ("MDFI"), these are also nucleators (cf. also Ullmann's Encyclopedia of Industrial Chemistry, 5th edition, volume A16, p. 719 ff.).

When cold flow improvers are present, the inventive middle distillate fuels comprise these, in addition to the inventive copolymer, in an amount of typically 1 to 2000 ppm by weight, preferably of 5 to 1000 ppm by weight, especially of 10 to 750 ppm by weight and in particular of 50 to 500 ppm by weight, for example of 150 to 400 ppm by weight. Cold flow improvers of this kind are described, for example, in WO 2007/147753, particularly at page 13 line 1 to page 16 32 therein, which is hereby incorporated into the present disclosure by reference.

Preferred flow improvers are ethylene-vinyl acetate copolymers as described in WO 99/29748, or comb polymers as described in WO 2004/035715, and form, together with the inventive copolymer in its function as a paraffin dispersant, an efficient and versatile cold stabilization system for middle distillate fuels, especially for those having a proportion of biodiesel.

More preferably, the flow improvers are copolymers of ethylene with at least one further ethylenically unsaturated monomer, preferably selected from alkenyl carboxylates, (meth)acrylic esters, dialkyl maleates, dialkyl fumarates and olefins.

Most preferably, the flow improvers are ter- or quaterpolymers of ethylene and at least one alkenyl carboxylate and with at least one further ethylenically unsaturated monomer, preferably selected from (meth)acrylic esters, dialkyl maleates, dialkyl fumarates and olefins.

Suitable olefins are, for example, those having 3 to 10 carbon atoms and having 1 to 3, preferably having 1 or 2, especially having one carbon-carbon double bond(s). In the latter case, the carbon-carbon double bond may either be terminal (α-olefins) or internal. Preference is given, however, to α-olefins, particular preference to α-olefins having 3 to 6 carbon atoms, for example propene, 1-butene, 1-pentene and 1-hexene.

Suitable (meth)acrylic esters are, for example, esters of (meth)acrylic acid with $C_1$- to $C_{10}$-alkanols, especially with methanol, ethanol, propanol, isopropanol, n-butanol, sec-butanol, isobutanol, tert-butanol, pentanol, hexanol, heptanol, octanol, 2-ethylhexanol, nonanol and decanol.

Suitable alkenyl carboxylates are, for example, the vinyl and propenyl esters of carboxylic acids having 2 to 20 carbon atoms, wherein the hydrocarbyl radical may be linear or branched. Among these, preference is given to the vinyl esters. Among the carboxylic acids having a branched hydrocarbyl radical, preference is given to those wherein the branch is in the α position to the carboxyl group, the α carbon atom more preferably being tertiary, meaning that the carboxylic acid is what is called a neocarboxylic acid. However, the hydrocarbyl radical of the carboxylic acid is preferably linear.

Examples of suitable alkenyl carboxylates are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, preference being given to the vinyl esters. A particularly preferred alkenyl carboxylate is vinyl acetate; typical copolymers that result therefrom are ethylene-vinyl acetate copolymers ("EVA"), which are used on a large scale and diesel fuels.

More preferably, the ethylenically unsaturated monomer is selected from alkenyl carboxylates.

Examples of dialkyl maleates and dialkyl fumarates are the methyl, ethyl, n-propyl, isopropyl, n-butyl, sec-butyl, isobutyl, n-pentyl, n-hexyl, 2-ethylhexyl and 2-propylheptyl esters of maleic acid or fumaric acid, these being mixed or preferably identical esters, i.e. in the case of alkyl radicals are the same.

Also suitable are copolymers comprising two or more different alkenyl carboxylates in copolymerized form, these differing in terms of the alkenyl function and/or in terms of the carboxylic acid group. Likewise suitable are copolymers which, as well as the alkenyl carboxylate(s), comprise at least one olefin and/or at least one (meth)acrylic ester in copolymerized form.

The ethylenically unsaturated monomer is copolymerized within the copolymer in an amount of preferably 1 to 50 mol %, especially of 10 to 50 mol % and in particular of 5 to 20 mol %, based on the overall copolymer.

The copolymers preferably have a number-average molecular weight $M_n$ of 1000 to 20 000, more preferably of 1000 to 10 000 and especially of 1000 to 6000.

It is likewise possible, through the use of the inventive copolymers, to improve a number of further fuel properties. Mention shall be made here by way of example merely of the additional effect as a cloud point depressant (CPD) or as a booster together with a flow improver for further improvement of the CFPP.

The inventive copolymers can be added either to middle distillate fuels entirely of fossil origin, i.e. those that have been obtained from mineral oil, or to fuels which, as well as the proportion based on mineral oil, comprise a proportion of biodiesel, in order to improve the properties thereof. In both cases, a distinct improvement in the cold flow characteristics of the middle distillate fuel is observed, i.e. a lowering of the CP values and/or CFPP values, irrespective of the origin or the composition of the fuel. The paraffin crystals which precipitate out are effectively kept suspended, and so there are no blockages of filters and lines by sedimented paraffin. The inventive copolymers have a good activity spectrum and thus achieve very good dispersion of the paraffin crystals which precipitate out in a wide variety of different middle distillate fuels.

The present invention also provides fuels, especially those with a biodiesel content, comprising the inventive copolymers.

In general, the fuels or fuel additive concentrates also comprise, as further additives in amounts customary therefor, flow improvers (as described above), further paraffin dispersants, conductivity improvers, anticorrosion additives, lubricity additives, antioxidants, metal deactivators, antifoams, demulsifiers, detergents, cetane number improvers, solvents or diluents, dyes or fragrances or mixtures thereof. The aforementioned further additives are familiar to those skilled in the art and therefore need not be explained any further here.

In the context of the present invention, fuel oils shall be understood to mean middle distillate fuels of fossil, vegetable or animal origin, biofuel oils ("biodiesel") and mixtures of such middle distillate fuels and biofuel oils.

Middle distillate fuels (also called "middle distillates" for short hereinafter) are especially understood to mean fuels which are obtained by distilling crude oil as the first process step and boil within the range from 120 to 450° C. Such middle distillate fuels are used especially as diesel fuel, heating oil or kerosene, particular preference being given to diesel fuel and heating oil. Preference is given to using low-sulfur middle distillates, i.e. those which comprise less than 350 ppm of sulfur, especially less than 200 ppm of sulfur, in particular less than 50 ppm of sulfur. In special cases they comprise less than 10 ppm of sulfur; these middle distillates are also referred to as "sulfur-free". They are generally crude oil distillates which have been subjected to refining under hydrogenating conditions and therefore comprise only small proportions of polyaromatic and polar compounds. They are preferably those middle distillates which have 90% distillation points below 370° C., especially below 360° C. and in special cases below 330° C.

Low-sulfur and sulfur-free middle distillates may also be obtained from relatively heavy mineral oil fractions which cannot be distilled under atmospheric pressure. Typical conversion processes for preparing middle distillates from heavy crude oil fractions include: hydrocracking, thermal cracking, catalytic cracking, coking processes and/or visbreaking. Depending on the process, these middle distillates are obtained in low-sulfur or sulfur-free form, or are subjected to refining under hydrogenating conditions.

The middle distillates preferably have aromatics contents of below 28% by weight, especially below 20% by weight. The content of normal paraffins is between 5% by weight and 50% by weight, preferably between 10 and 35% by weight.

In the context of the present invention, middle distillate fuels shall also be understood here to mean those fuels which can either be derived indirectly from fossil sources such as mineral oil or natural gas, or else are produced from biomass via gasification and subsequent hydrogenation. A typical example of a middle distillate fuel which is derived indirectly from fossil sources is the GTL ("gas-to-liquid") diesel fuel obtained by means of Fischer-Tropsch synthesis.

A middle distillate is prepared from biomass, for example, via the BTL ("biomass-to-liquid") process, and can be used as fuel either alone or in a mixture with other middle distillates. The middle distillates also include hydrocarbons which are obtained by the hydrogenation of fats and fatty oils. They comprise predominantly n-paraffins.

The qualities of the heating oils and diesel fuels are laid down in more detail, for example, in DIN 51603 and EN 590 (cf. also Ullmann's Encyclopedia of Industrial Chemistry, 5th edition, volume A12, p. 617 ff.).

In addition to its use in the middle distillate fuels of fossil, vegetable or animal origin mentioned, which are essentially hydrocarbon mixtures, the inventive copolymer can also be used in biofuel oils and in mixtures of the middle distillates mentioned with biofuel oils, in order to improve cold flow characteristics. Mixtures of this kind are commercially available and usually comprise the biofuel oils in minor amounts, typically in amounts of 1% to 30% by weight, especially of 3% to 10% by weight, based on the total amount of middle distillate of fossil, vegetable or animal origin and biofuel oil.

Biofuel oils are generally based on fatty acid esters, preferably essentially on alkyl esters of fatty acids which derive from vegetable and/or animal oils and/or fats. Alkyl esters are preferably understood to mean lower alkyl esters, especially $C_1$- to $C_4$-alkyl esters, which are obtainable by transesterifying the glycerides which occur in vegetable and/or animal oils and/or fats, especially triglycerides, by means of lower alcohols, for example ethanol or in particular methanol ("FAME"). Typical lower alkyl esters which are based on vegetable and/or animal oils and/or fats and find use as a biofuel oil or components thereof are, for example, HVO (hydrogenated vegetable oil), sunflower methyl ester, palm oil methyl ester ("PME"), soya oil methyl ester ("SME") and especially rapeseed oil methyl ester ("RME").

The inventive copolymer brings about a reduction in the crystallization of paraffin crystals in fuels, especially those which comprise biofuel oils.

The other further additives mentioned above are, incidentally, familiar to those skilled in the art and therefore need not be elucidated here any further.

The examples which follow are intended to elucidate the present invention without restricting it.

EXAMPLES

Preparation Examples 1 to 16

Step 1:

A 2 liter pilot stirrer system was initially charged with the amount of Solvesso® 150 and olefin specified in table A. The initial charge was sparged with N2 and heated up to 150° C. On attainment of the temperature, at the same time, the amount of maleic anhydride (MA) specified in table A, in molten form at 80° C., was added continuously to the reaction mixture through a heatable feed within 3 hours.

In parallel, the amount of tert-butyl peroxide specified in table A was metered into the reaction as initiator within 3 hours, as was, in a separate feed, the amount of the appropriate acrylate specified in table A. After the feeding of maleic anhydride and initiator had ended, the reaction mixture was left to stir further at 150° C. for one hour.

Step 2:

The amount of amine 1 specified in table A was added to the reaction mixture from step 1. The mixture was stirred at 160° C. for 4 hours. Subsequently, the amount of amine 2 specified in table A was again added all at once and the mixture was stirred for an additional 15 minutes. Subsequently, the reaction was cooled down and ended. If necessary, the copolymer was subsequently diluted to a content of 50% in Solvesso® 150.

Weight-average molecular weight (Mw) and polydispersity (PD) of the resultant copolymers were determined via GPC and reported in table B.

Use Examples

In the use examples, diesel fuels (DF) having the details of origin and indices reported in table C were used.

Efficacy as Paraffin Dispersants (WASAs)

In the examples which follow (tables 1-4), the copolymers prepared above were examined for their efficacy as paraffin dispersants (WASAs) in the presence of customary flow improvers (MDFIs).

The cloud point (CP) to ISO 3015 and the CFPP to EN 116 of the additized fuel samples were determined. Thereafter, the additized fuel samples in 500 ml glass cylinders, in order to determine the delta CP, were cooled to −16° C. in a cold bath and stored at this temperature for 16 hours. For each sample, the CP was again determined to ISO 3015 on the 20% by volume base phase separated off at −16° C. The smaller the deviation of the CP of the 20% by volume base phase from the original CP (delta CP) for the respective fuel sample, the better the dispersion of the paraffins.

The smaller the delta CP and the lower the CFPP, the better the cold flow characteristics of a diesel fuel.

The inventive copolymers improve the cold flow characteristics in terms of delta CP or CFPP or both parameters.

The procedure for the brief sediment test was analogous to Aral Method QSAA FKL 027, with the following modification:

Diesel fuels 1-4: cool to −16° C. and keep at this temperature for 16 h

WASA formulations comprise 36% by weight of the particular copolymer.

The MDFIs used are commercially available flow improver formulations:

MDFI 1 is a mixture of an ethylene/vinyl acetate copolymer, an ethylene/vinyl acetate/propylheptyl acrylate terpolymer and a polyacrylate in Solvent Naphtha MDFI 2 is an ethylene/vinyl acetate copolymer in Solvent Naphtha MDFI 3 is an ethylene/vinyl acetate/propylheptyl acrylate terpolymer in Solvent Naphtha MDFI 4 is an ethylene/vinyl acetate/ethylhexyl acrylate terpolymer in Solvent Naphtha Efficacy as Cloud Point Depressants (CPD)

In table 5, the inventive copolymer from example 1 was tested in various diesel fuels for its efficacy as a cloud point depressant (CPD).

The greater the lowering of the CP compared to the unadditized fuel, the better the efficacy as a cloud point depressant.

The inventive copolymers significantly lower the CP.

CPD formulation comprises 36% by weight of the copolymer from example 1 in Solvent Naphtha.

Efficacy as a CFPP Improver (Booster)

In table 6, the inventive copolymer from example 1 was tested as a co-additive (booster) for further CFPP improvement in the presence of a customary MDFI.

By virtue of the inventive copolymers, it is possible to achieve the target CFPP with a lower total dosage, or a lower CFPP is achieved with the same total dosage.

The co-additive comprises 36% by weight of copolymer 1 in Solvent Naphtha.

TABLE A

| Example | Solvesso 150 (g) | Olefin | (g) | MA (g) | Acrylate | (g) | tert-Butyl peroxide (g) | Amine 1 | (g) | Amine 2 | (g) |
|---|---|---|---|---|---|---|---|---|---|---|---|
| 1 | 363 | dodecene | 175 | 102 | lauryl acrylate | 265 | 2.83 | distearylamine | 541 | distearylamine | 541 |
| 2 | 268.05 | dodecene | 129 | 75 | lauryl acrylate | 195 | 2.09 | distearylamine | 398 | distearylamine | 398 |
| 3 | 203.4 | decene | 87 | 70 | lauryl acrylate | 181 | 1.83 | distearylamine | 371 | distearylamine | 371 |
| 4 | 168.16 | octene | 72 | 74 | lauryl acrylate | 192 | 1.83 | distearylamine | 392 | distearylamine | 392 |
| 5 | 104.7 | dodecene | 116 | 68 | heptadecyl acrylate | 215.4 | 2.09 | distearylamine | 360 | distearylamine | 360 |
| 6 | 117.27 | dodecene | 129 | 75 | tridecyl acrylate A | 195 | 2.09 | distearylamine | 398 | distearylamine | 398 |
| 7 | 117.27 | dodecene | 129 | 75 | tridecyl acrylate N | 195 | 2.09 | distearylamine | 398 | distearylamine | 398 |
| 8 | 166.09 | dodecene | 180 | 106 | nonyl acrylate | 213 | 2.61 | distearylamine | 562 | distearylamine | 562 |
| 9 | 198.27 | dodecene | 213 | 124 | n-butyl acrylate | 162.5 | 2.61 | distearylamine | 657 | distearylamine | 657 |
| 10 | 315 | dodecene | 153 | 87 | ethylhexyl acrylate | 163.7 | 2.09 | distearylamine | 461 | distearylamine | 461 |
| 11 (comp.) | 363 | dodecene | 175 | 102 | lauryl acrylate | 265 | 2.83 | distearylamine | 540 | didodecylamine | 368 |
| 12 (comp.) | 150 | — | — | 139 | lauryl acrylate | 361 | 2.61 | distearylamine | 737 | distearylamine | 737 |
| 13 (comp.) | 495.8 | dodecene | 600 | 175 | — | — | 4.85 | distearylamine | 928 | distearylamine | 928 |
| 14 (comp.) | 313 | C20-24 | 268 | 102 | — | — | 4.2 | distearylamine | 541 | distearylamine | 541 |
| 15 (comp.) | 96.8 | dodecene | 108.7 | 63.43 | behenyl acrylate | 227.9 | 2.09 | distearylamine | 336 | distearylamine | 336 |
| 16 (comp.) | 363 | dodecene | 175 | 102 | lauryl acrylate | 265 | 2.83 | didodecylamine | 368 | distearylamine | 540 |

TABLE B

| Example | Molecular weight (Mw) | PD |
|---|---|---|
| 1 | 4250 | 2 |
| 2 | 3750 | 2 |
| 3 | 3310 | 2 |
| 4 | 5150 | 2.2 |
| 5 | 5200 | 2.1 |
| 6 | 5670 | 2.1 |
| 7 | 4520 | 2.2 |
| 8 | 5390 | 2 |
| 9 | 5060 | 2.1 |
| 10 | 2860 | 2 |
| 11 (comp.) | 4250 | 2 |
| 12 (comp.) | 4450 | 2.1 |
| 13 (comp.) | 4000 | 2 |
| 14 (comp.) | 4200 | 2.1 |
| 15 (comp.) | 7510 | 2.5 |
| 16 (comp.) | 4250 | 2 |

TABLE C

| Origin | DF 1 Central Europe | DF 2 Central Europe | DF 3 Eastern Europe | DF 4 Central Europe | DF 7 Southern Europe | DF 8 Central Europe | DF 9 Central Europe | DF 10 USA | DF 11 Eastern Europe |
|---|---|---|---|---|---|---|---|---|---|
| Cloud point CP [° C.] | −5.6 | −7.1 | −8.3 | −4.8 | −5.3 | −6.1 | −4.9 | −15.5 | −7.8 |
| CFPP [° C.] | −5 | −8 | −8 | −5 | −13 | −8 | −6 | −18 | −9 |
| Density @15° C. [kg/m3] | 842.6 | 839.2 | 827.9 | 845.1 | 841.3 | 839.7 | 834.1 | 831.4 | 830 |
| 90% by vol.-20% by vol. [° C.] | 118 | n.d. | 115 | 113 | 127 | 124 | 114 | 116 | 113 |
| IBP [° C.] | 168 | n.d. | 179 | 172 | 171 | 171 | 164 | 167 | 167 |
| FBP [° C.] | 359 | n.d. | 359 | 360 | 363 | 356 | 359 | 363 | 355 |
| n-Paraffins [%] | 18.2 | 19.1 | 21.9 | 17.1 | 15.2 | 19.3 | 17.2 | 15.6 | 16.9 |

TABLE 1

DF 1; CFPP: −5° C.; CP: −5.6° C.

| MDFI | Dosage [ppm] | WASA with copolymer from example | Dosage [ppm] | CFPP [° C.] | Delta CP [K] |
|---|---|---|---|---|---|
| MDFI 1 | 150 | 1 | 150 | −29 | 2.4 |
| MDFI 1 | 150 | 4 | 150 | −30 | 3.2 |
| MDFI 1 | 150 | 5 | 150 | −27 | 1.7 |
| MDFI 1 | 150 | 6 | 150 | −28 | 2.7 |
| MDFI 1 | 150 | 7 | 150 | −27 | 2.8 |
| MDFI 1 | 150 | 9 | 150 | −28 | 2.8 |
| MDFI 1 | 150 | 11 (comp.) | 150 | −25 | 5.5 |
| MDFI 1 | 150 | 12 (comp.) | 150 | −16 | 3.2 |
| MDFI 1 | 150 | 14 (comp.) | 150 | gelated | n.a. |
| MDFI 1 | 150 | 15 (comp.) | 150 | −9 | 6.1 |
| MDFI 1 | 150 | 16 (comp.) | 150 | −19 | 4.1 |

TABLE 2

DF 2; CFPP: −8° C.; CP: −7.1° C.

| MDFI | Dosage [ppm] | WASA with copolymer from example | Dosage [ppm] | CFPP [° C.] | Delta CP [K] |
|---|---|---|---|---|---|
| MDFI 2 | 150 | 1 | 150 | −29 | 1.3 |
| MDFI 2 | 150 | 2 | 150 | −27 | 0.9 |
| MDFI 2 | 150 | 3 | 150 | −27 | 1.4 |
| MDFI 2 | 150 | 6 | 150 | −29 | 1.5 |
| MDFI 2 | 150 | 8 | 150 | −27 | 1.4 |
| MDFI 2 | 150 | 10 | 150 | −27 | 1.4 |
| MDFI 2 | 150 | 12 (comp.) | 150 | −27 | 2.4 |
| MDFI 2 | 150 | 15 (comp.) | 150 | −10 | 5.1 |

TABLE 3

DF 3; CFPP: −8° C.; CP: −8.3° C.

| MDFI | Dosage [ppm] | WASA with copolymer from example | Dosage [ppm] | CFPP [° C.] | Delta CP [K] |
|---|---|---|---|---|---|
| MDFI 3 | 300 | 1 | 200 | −28 | 1.9 |
| MDFI 3 | 300 | 3 | 200 | −28 | 1.1 |
| MDFI 3 | 300 | 7 | 200 | −29 | 2 |
| MDFI 3 | 300 | 11 (comp.) | 200 | −27 | 9 |
| MDFI 3 | 300 | 13 (comp.) | 200 | −24 | 4.1 |
| MDFI 3 | 300 | 15 (comp.) | 200 | −20 | 6.3 |
| MDFI 3 | 300 | 16 (comp.) | 200 | −20 | 2 |

TABLE 4

DF 4; CFPP: −5° C.; CP: −4.8° C.

| MDFI | Dosage [ppm] | WASA with copolymer from example | Dosage [ppm] | CFPP [° C.] | Delta CP [K] |
|---|---|---|---|---|---|
| MDFI 1 | 150 | 1 | 150 | −29 | 3.3 |
| MDFI 1 | 150 | 7 | 150 | −26 | 3.4 |
| MDFI 1 | 150 | 9 | 150 | −26 | 3.1 |
| MDFI 1 | 150 | 15 (comp.) | 150 | −7 | 6.4 |

TABLE 5

| CPD formulation | Dosage [ppm] | CP [° C.] DF 7 | CP [° C.] DF 8 | CP [° C.] DF 9 | CP [° C.] DF 10 | CP [° C.] DF 11 |
|---|---|---|---|---|---|---|
| — | — | −5.3 | −6.1 | −4.4 | −15.5 | −7.8 |
| Copolymer from ex. 1 | 100 | −6.2 | — | −5.8 | −17.2 | −9.1 |
| Copolymer from ex. 1 | 300 | −7.1 | −8.5 | −6.7 | −17.9 | −10 |
| Copolymer from ex. 1 | 500 | −7.7 | −9 | −7.1 | −18.3 | −10.6 |

TABLE 6

DF 11; CFPP: −9° C.; CP: −7.8° C.

| MDFI | Dosage [ppm] | Copolymer from example | Dosage [ppm] | CFPP [° C.] |
|---|---|---|---|---|
| — | — | — | — | −9 |
| MDFI 4 | 100 | — | — | −13 |
| MDFI 4 | 200 | — | — | −20 |
| MDFI 4 | 300 | — | — | −23 |
| MDFI 4 | 150 | 1 | 50 | −23 |
| MDFI 4 | 225 | 1 | 75 | −28 |

The invention claimed is:

1. A copolymer, obtained by copolymerization of
   (A) at least one unsaturated dicarboxylic acid or a derivative thereof,
   (B) at least one α-olefin having from at least 6 up to and including 20 carbon atoms,
   (C) at least one $C_3$- to $C_{20}$-alkyl ester of acrylic acid or methacrylic acid or a mixture thereof and
   (D) optionally one or more further copolymerizable monomers other than monomers (A), (B) and (C),
   followed by reaction with at least one dialkylamine (E), where two alkyl radicals in the at least one dialkylamine (E) are independently alkyl radicals having at least 17 up to 30 carbon atoms.

2. The copolymer according to claim 1, wherein monomer (A) is selected from the group consisting of maleic acid, fumaric acid, 2-methylmaleic acid, 2,3-dimethylmaleic acid, 2-methylfumaric acid, 2,3-dimethylfumaric acid, methylenemalonic acid and tetrahydrophthalic acid, and a derivative thereof.

3. The copolymer according to claim 1, wherein monomer (B) is selected from the group consisting of 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene.

4. The copolymer according to claim 1, wherein monomer (C) is an ester obtained by reacting acrylic acid or methacrylic acid with at least one alcohol selected from the group consisting of n-propanol, isopropanol, n-butanol, sec-butanol, isobutanol, tert-butanol, n-pentanol, tert-pentanol, n-hexanol, n-heptanol, n-octanol, 2-ethylhexanol, n-nonanol, isononanol, n-decanol, 2-propylheptanol, n-undecanol, isoundecanol, n-dodecanol, n-tridecanol, isotridecanol, 3,3,5,5,7-pentamethyloctanol, n-tetradecanol, n-pentadecanol, n-hexadecanol, n-heptadecanol, isoheptadecanol, 3,3,5,5,7,7,9-heptamethyldecanol, n-octadecanol, and n-eicosanol.

5. The copolymer according to claim 1, wherein the optional monomer (D) is selected from the group consisting of a cycloaliphatic (meth)acrylate (D1), a (meth)acrylate of a polyalkylene glycol monoalkyl ether (D2), a vinyl alkanoate (D3), an allyl compound (D4), a vinyl ether (D5), a N-vinyllactam (D6), a N-vinylimidazole (D7), an ethylenically unsaturated aromatic (D8), sulfur dioxide (D9), and an ethylenically unsaturated nitrile (D10).

6. The copolymer according to claim 1, wherein monomers (A) to (D) in copolymerized form have a molar incorporation ratio of (A):(B):(C):(D) of 1:0.5 to 2.0:0.5 to 2.0:0 to 0.1.

7. The copolymer according to claim 1, wherein the dialkylamine (E) is di-n-octadecylamine, di-n-nonadecylamine, or di-n-eicosylamine.

8. The copolymer according to claim 1, wherein a molar ratio of the dialkylamine (E) based on incorporated units of the dicarboxylic acid (A) in the copolymer is at least 1.2:1 and up to 2.0:1.

9. The copolymer according to claim 1, having a weight-average molecular weight ($M_w$) of 2000 to 20 000 determined by gel permeation chromatography.

10. A process for preparing the copolymer according to claim 1, the process comprising:
    carrying out the copolymerization at a temperature of 50 to 250° C. in an apparatus operated continuously or batchwise, and
    subsequently reacting with the at least one dialkylamine (E),
    wherein the copolymerization is solvent polymerization, emulsion polymerization, precipitation polymerization, or bulk polymerization.

11. A process for reducing a crystallization of paraffin crystal in fuel, the process comprising:
    introducing the copolymer according to claim 1 into the fuel.

12. A process for improving cold flow property of fuel oil or for improving filterability of fuel oil comprising cold flow improver additives, the process comprising:
    introducing the copolymer according to claim 1 into the fuel oil or the fuel oil comprising the cold flow improver additives.

13. A fuel oil, comprising
    10 to 5000 ppm by weight of at least one copolymer according to claim 1 and
    optionally at least one further additive selected from the group consisting of a cold flow improver, a paraffin dispersant, a conductivity improver, an anticorrosion additive, a lubricity additive, an antioxidant, a metal deactivator, an antifoam, a demulsifier, a detergent, a cetane number improver, a solvent or a diluent, a dye, and a fragrance.

* * * * *